June 17, 1924.
J. F. D. HOGE
BATTERY HOLDER
Filed Nov. 29, 1922
1,497,786
2 Sheets-Sheet 1
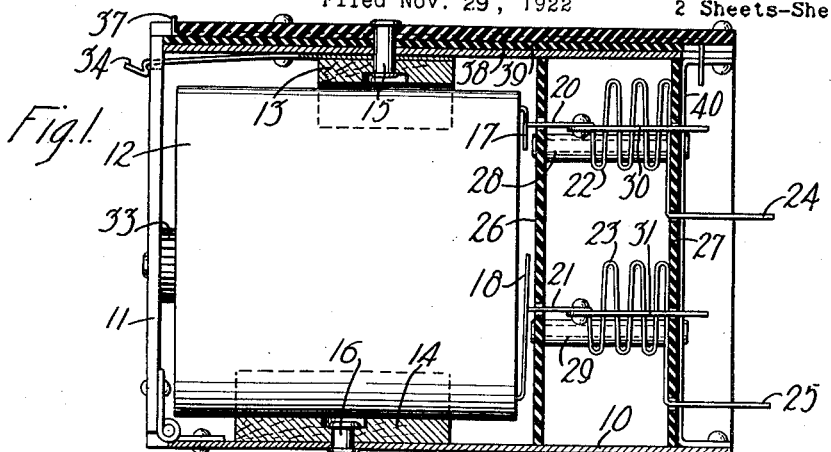
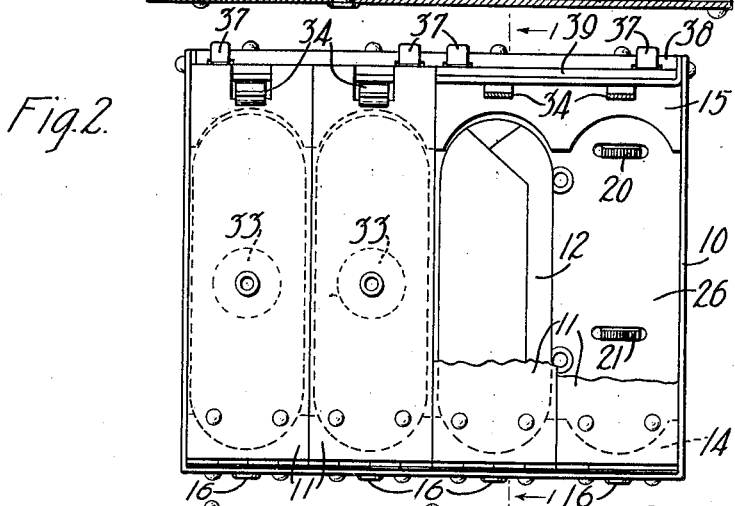
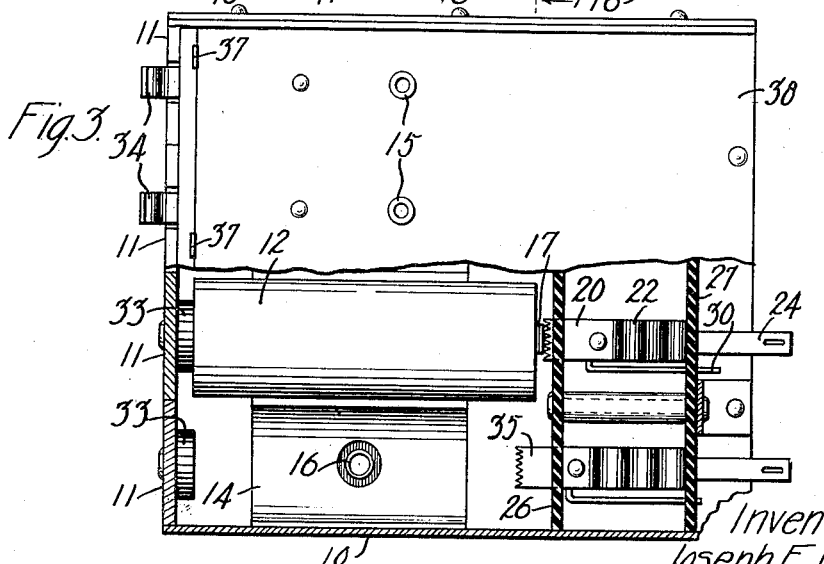
Inventor:
Joseph F. D. Hoge,
by Paul C. R. Palmer Atty June 17, 1924.

J. F. D. HOGE

BATTERY HOLDER

Filed Nov. 29, 1922

Inventor:
Joseph F. D. Hoge,
by Joel Ch. Palmer Atty.

Patented June 17, 1924.

1,497,786

UNITED STATES PATENT OFFICE.

JOSEPH F. D. HOGE, OF NEW YORK, N. Y., ASSIGNOR TO WESTERN ELECTRIC COMPANY, INCORPORATED, OF NEW YORK, N. Y., A CORPORATION OF NEW YORK.

BATTERY HOLDER.

Application filed November 29, 1922. Serial No. 604,051.

*To all whom it may concern:*

Be it known that I, JOSEPH F. D. HOGE, a citizen of the United States, residing at New York, in the county of New York, State of New York, have invented certain new and useful Improvements in Battery Holders, of which the following is a full, clear, concise, and exact description.

This invention relates to battery holders. An object of this invention is to avoid disturbing soldered or other permanent connections in removing or replacing a battery in a battery holder, while insuring that the terminals connected to the battery are always of the same polarity.

An object of the invention is to insure constant contact pressure between the battery terminals and the connecting members in contact therewith.

The particular form of this invention hereinafter described in detail comprises a box slotted to hold in parallel relation a plurality of oval shaped flash light batteries. Two coiled or Z-shaped springs are provided for each battery so disposed that the upper ends of the springs will contact with the two terminals of the battery only when the battery is so placed within the box as to give the proper polarity desired. The other ends of the springs are wired to connections leading to the electric circuit in which it is desired to utilize the battery potential. In order to prevent the springs from side-slipping and failing to give a constant contact pressure against the battery terminals, guiding means are provided for maintaining each of the springs in a position parallel to its normal axis.

Referring to the drawings, Fig. 1 represents a sectional view of one form of this invention.

Fig. 2 represents a front view of Fig. 1.

Fig. 3 represents a top view of the box of Fig. 1.

Figure 4:
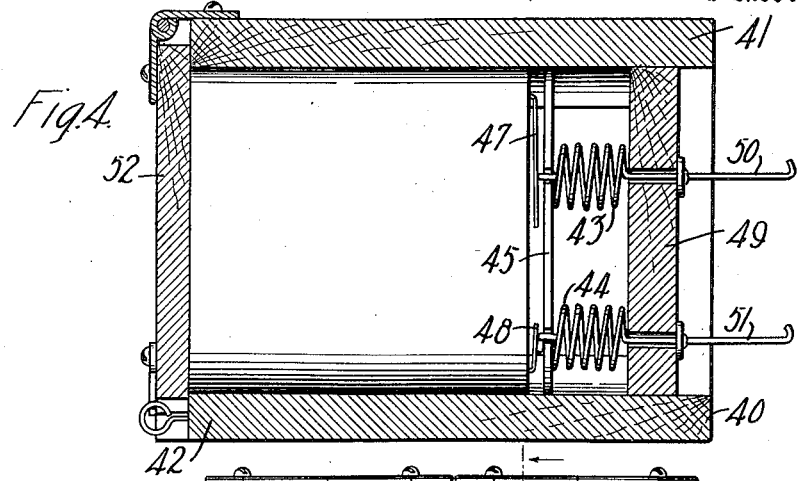
Fig. 4 illustrates a second form of this invention.

Referring more particularly to the form of this invention illustrated in Fig. 1, a metallic box 10 is disclosed therein having a hinged cover 11 at one end whereby a battery, such as 12, may be inserted in the box. The hollowed blocks 13 and 14, held by eyelets 15 and 16, provide a runway for the battery 12 to hold the battery in position. The two contact members 17 and 18 of the battery are, when the cover 11 is closed, held tightly against movable contact members 20 and 21 which may be, as shown, integral with the two springs 22 and 23. Whenever the battery is in this position, the springs 22 and 23 serve to maintain a constant contact pressure between the terminals 20 and 21 and the battery terminals. Current passing from the battery and through the contact springs 22 and 23 by wires 24 and 25 connected to the opposite ends of the springs may be employed in any electric circuit desired.

In order to prevent springs 22 and 23 from side-slipping and failing to give a uniform contact pressure with the battery terminals, guiding means may be provided for maintaining each of the contact springs in a position parallel to its normal axis. One way this may be accomplished is by providing an insulating plate 26 supported from the side 27 of the box by a plurality of posts 28 and 29. The contact member 20 may, as shown in Fig. 3, comprise a flat metallic strip passing through an aperture in plate 26. The end of contact spring 22, adjacent the battery, is also connected to a straight wire 30 which passes through an aperture in the side 27 of the box. The wire 30 will, therefore, pass freely through the side wall 27 and the contact member 20 will pass freely through plate 26 to allow spring 22 to contract or expand depending upon the presence or absence of the battery 12, while these sliding members leading through the apertures will serve to maintain the spring 20 in a position substantially parallel to its axis, thereby preventing the spring from failing to give the desired contact pressure. Spring 23 is provided with a similar straight wire 31 which also passes through an aperture in the side wall 27, whereby spring 23 is held in a position parallel to the wire 31.

The box 10 may be made of a size sufficient to hold any desired number of batteries and, as shown in Fig. 2, the box 10 is capable of holding four oval shaped batteries, each of these batteries, of course, being provided with two springs, such as springs 22 and 23, of Fig. 1. The cover 11 for the box may be provided with a plurality of disks 33 of insulating material to exert pressure upon each battery when the cover is closed, at the same time insulating the battery from the metallic cover. The cover 11 may, if desired, be composed of four separate parts, whereby each battery may be removed and replaced without disturbing the other batteries. A suitable spring catch 34 is shown for each of the four parts of the cover 11.

As shown in Fig. 3, the portion of the contact members, such as 20 and 21, presents an irregularly shaped surface to the battery terminals, whereby a better electrical contact is insured. The contact member 35 of Fig. 3 is shown in the position taken by its contact member when the spring is fully released due to the absence of a battery, while the position of contact member 20 of Fig. 3 is the position taken when the spring is compressed due to the insertion of a battery.

A convenient arrangement for testing the voltage of any particular battery in the box during operation is provided by a metallic strip 37 leading from a point adjacent the cover 11 between the two insulating strips 38 and 39 to a point in the rear of the springs, where by means of a metallic connection, (not shown,) the terminal 37 may be electrically connected to the wire 24. The provision of such a connecting strip for each of the batteries allows the potential of any one of the batteries to be measured while in use by merely contacting test conductors to the ends of the strips, such as at 37. This arrangement is of particular advantage when, for example, the box 10 has its back 27 mounted on the face of an upright apparatus panel so that by means of the terminals, such as 37, the potential of each battery may be measured from the panel without disturbing the electrical connections of the batteries.

Figure 5:
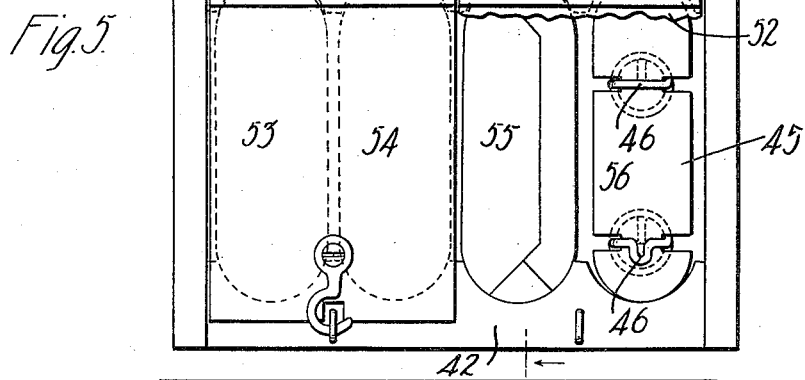
Fig. 5 is a front view of Fig. 4.
Figure 6:
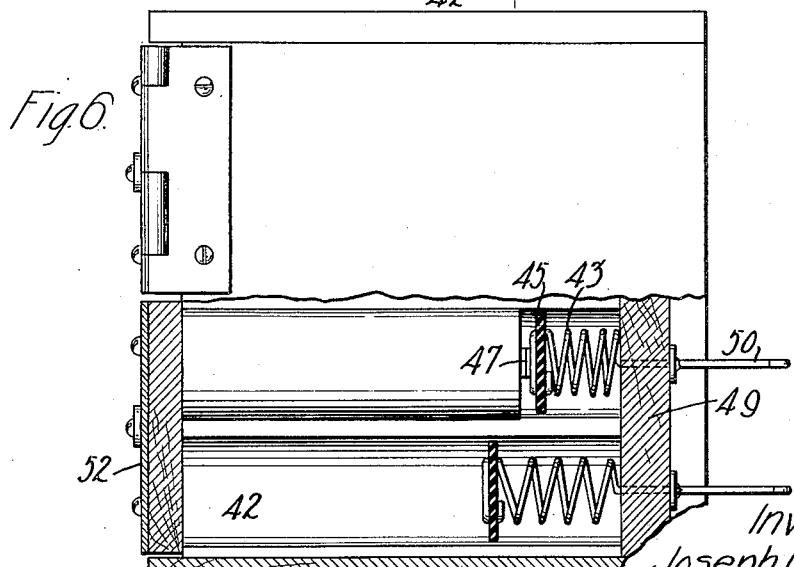
Fig. 6 is a bottom view of the box in Fig. 4.

Figs. 4, 5 and 6 are corresponding views of another form of this invention in which a somewhat different spring contact arrangement is employed. The wooden box 40 has its sides 41 and 42 grooved so as to receive four oval shaped batteries shown more particularly in Fig. 2. At the bottom of each battery position are two coiled springs 43 and 44, the upper ends of which pass through slots in an insulating plate 45 which moves freely with the springs when the springs are compressed or expanded due to the presence or absence of a battery in each battery position. The upper ends 46 of the springs are bent over parallel to the face of the insulating plate 45 so as to provide good contact with the terminals 47 and 48 of the battery. The opposite ends of the springs 43 and 44 pass through the back 49 of the box and are connected to wires 50 and 51, whereby each battery potential may be utilized in any desired electrical circuit. A hinged cover 52 for the box is shown whereby the battery in each of the positions 53 and 54 may be removed or replaced without disturbing the batteries in positions 55 and 56.

As will be noted both from Fig. 1 and Fig. 4, the two spring members for each battery position are not symmetrically placed with respect to the sides of the box. This is for the reason that since the battery terminals, such as 17 and 18, are customarily of different length, the arrangement of the spring 22 so that the axis of the spring is closer its side of the battery than the axis of spring 23 is to its side, enables contact to be made between the battery terminal 17 and the end of spring 22, but no contact would be made if battery 12 were reversed and an attempt was made to contact terminal 17 with the upper end 21 of spring 23. This arrangement, therefore, results in insuring that each battery will always be placed in the box so as to give the outgoing conductors the same polarity each time a battery is replaced. This is of particular importance, for example, when the leads 24 and 25 are led respectively to the grid and cathode electrodes of a vacuum tube repeater, for in such a case, it is generally essential for a satisfactory operation of the circuit that the grid electrode be maintained at a negative potential instead of a positive potential with respect to the cathode. If the springs were symmetrically arranged, however, the grid would be likely, at one time, to be positive with respect to the cathode and negative at another time depending on how the battery had been inserted. Reversing the polarity so that the grid electrode would be positive instead of negative with respect to the cathode would in some instances be sufficient to increase the space current to a sufficient extent to seriously impair the operation of the tube if not actually destroying it.

It is to be understood that this invention is not limited to the particular forms described above but that the invention may have widely different embodiments without departing anywise from the spirit of the invention as defined in the appended claims.

The invention claimed is:

1. A battery holder comprising a socket arranged to receive a battery, a plate closing one end of the socket, two contact springs arranged on the side of said plate opposite the socket, the upper terminals of said springs projecting through apertures in said plate, whereby the springs may contact with the battery terminals, the upper ends of said springs and the contacts of the battery being arranged to make electrical connections only when the positive pole of said battery is connected to a certain one of said springs, a second plate on the opposite side of said springs from said first plate, and guiding means fastened to each of said springs and passing through an aperture in said second plate.

2. A battery holder comprising a socket arranged to receive a battery, two contact springs rigidly mounted on a side of said holder and projecting in the direction of said socket, means integral with each of said springs and passing through the side of said holder to permit electrical connection to said springs, guiding means for said springs comprising a plate of insulating material separating the socket from the main portions of said springs, the upper ends of said springs projecting beyond said plate to contact with the terminals of the battery, the terminals of said battery and the adjacent ends of said springs being spatially arranged to contact with each other only when the positive pole of said battery contacts with a certain one of said springs.

3. A battery holder comprising a socket arranged to receive a battery, two parallel contact springs mounted on a side of said holder, an insulating plate separating the socket from coiled portion of said springs, the upper ends of said springs projecting through apertures in said plate to contact with the terminals of said battery, means integral with each of said springs and passing through the side of said holder to permit electrical connection to said springs, and guiding means passing through a side of said holder for maintaining the axis of each of said springs substantially straight when the springs are compressed.

4. A battery holder comprising a socket arranged to receive a battery, two contact springs rigidly attached to one end of said socket and arranged to contact with the battery terminals when the battery is in such a position that a certain one of said springs is connected to the positive pole of the battery and the other spring to the negative pole of the battery and failing to contact when the battery is in the reverse position, and guiding means for maintaining the axis of each of said springs substantially straight when the spring is subjected to pressure due to the insertion of the battery in the socket, the voltage of the battery being supplied to an electric circuit through said contact springs.

In witness whereof, I hereunto subscribe my name this 27th day of November A. D., 1922.

JOSEPH F. D. HOGE.